United States Patent
Trainer et al.

(10) Patent No.: US 8,837,176 B2
(45) Date of Patent: Sep. 16, 2014

(54) CONVERTER WITH REACTIVE POWER COMPENSATION

(75) Inventors: David Reginald Trainer, Derbyshire (GB); Colin Charnock Davidson, Staffordshire (GB)

(73) Assignee: Alstom Technology, Ltd., Baden (CH)

(*) Notice: Subject to any disclaimer, the term of this patent is extended or adjusted under 35 U.S.C. 154(b) by 119 days.

(21) Appl. No.: 13/388,624

(22) PCT Filed: Aug. 3, 2009

(86) PCT No.: PCT/EP2009/060051
§ 371 (c)(1),
(2), (4) Date: Apr. 6, 2012

(87) PCT Pub. No.: WO2011/015227
PCT Pub. Date: Feb. 10, 2011

(65) Prior Publication Data
US 2012/0188803 A1    Jul. 26, 2012

(51) Int. Cl.
*H02M 1/12* (2006.01)
*H02M 7/217* (2006.01)

(52) U.S. Cl.
USPC .............................. 363/44; 363/65; 363/125

(58) Field of Classification Search
CPC ......... H02M 1/12; H02M 7/21; H02M 7/217; H02M 7/2176; H02M 2001/12; H02M 2007/217
USPC ............. 363/39, 44, 65, 67, 68, 125; 323/266
See application file for complete search history.

(56) References Cited

U.S. PATENT DOCUMENTS

| 4,122,515 A | * | 10/1978 | Tachibana et al. | 363/45 |
| 5,499,178 A | * | 3/1996 | Mohan | 363/39 |
| 6,295,216 B1 | * | 9/2001 | Faria et al. | 363/44 |

FOREIGN PATENT DOCUMENTS

| CN | 2058286 | 6/1990 |
| CN | 201312267 | 9/2009 |
| EP | 1 244 203 A2 | 9/2002 |
| WO | WO 03/023933 A1 | 3/2003 |

OTHER PUBLICATIONS

Carrasco, J.M., Galván, E., and Portillo, R., Chapter 29: Wind Turbine Applications, in "Power Electronics Handbook" by Muhammad H. Rashid, Elsevier Academic Press, 2007, p. 737-768.

Sood, V.K., Chapter 30: HVDC Transmission, in "Power Electronics Handbook" by Muhammad H. Rashid, Elsevier Academic Press, 2007, p. 769-795.

Watanabe, E.H., Aredes, M., Barbosa, P.G., Santos, G. Jr., de Araújo Lima, F.K., and da Silva Dias, R.F., Chapter 31: Flexible AC Transmission Systems, in "Power Electronics Handbook" by Muhammad H. Rashid, Elsevier Academic Press, 2007, p. 797-822.

(Continued)

Primary Examiner — Gary L Laxton
(74) Attorney, Agent, or Firm — Knobbe Martens Olson & Bear LLP

(57) ABSTRACT

A voltage source converter for a HVDC power transmission system is disclosed. According to one aspect, the voltage source converter includes at least one phase element having series connected diodes configured to interconnect, in use, a DC network and an AC network. The voltage source converter further includes at least one auxiliary converter configured to act as a waveform synthesizer to modify the DC voltage presented to the DC side of one or more phase elements.

20 Claims, 7 Drawing Sheets

(56) References Cited

OTHER PUBLICATIONS

Mohan et al., "Power Electronics: Converters, Applications and Design, Basic Semiconductor Physics", Power Electronics: Converters, Applications and Design, John Wiley & Sons, New York, Jan. 1, 1989, pp. 435-450.
International Search Report and Written Opinion from International Application No. PCT/EP2009/060051, dated Apr. 28, 2010.
Discussions. http://www.eng.newcastle.edu.au/eeecs/fyweb/Archives/2005/c3023050/discuss.htm. Accessed on Dec. 13, 2013. The University of Newcastle Australia.
Konstantinou et al. "Performance Evaluation of Half-Bridge Cascaded Multilevel Converters Operated with Multicarrier Sinusoidal PWM Techniques." School of Electrical and Information Engineering. The University of Sydney. NSW, 2006, Australia. IEEE / ICIEA 2009. pp. 3399-3404.
Office Action for Chinese Patent Application No. 2009801576896 dated Sep. 18, 2013.
Office Action for Chinese Patent Application No. 2009801576896.4 dated Dec. 26, 2013.

* cited by examiner

CONVERTER WITH REACTIVE POWER COMPENSATION

RELATED APPLICATIONS

This application is a U.S. National Phase of International Application No. PCT/EP2009/060051, filed Aug. 3, 2009, which is incorporated by reference in its entirety.

FIELD OF THE INVENTION

The invention relates to a voltage source converter for high voltage direct current (HVDC) power transmission.

BACKGROUND OF THE TECHNOLOGY

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect the AC networks operating at different frequencies.

In any such power transmission network, converters are required at each interface between AC and DC power to effect the required conversion, and one such form of converter is a voltage source converter (VSC).

One form of known voltage source converter is shown in FIG. 1a and includes six sets of series connected insulated gate bipolar transistors (IGBTs) 10 and anti-parallel diodes 12. The IGBTs 10 are connected and switched together in series to enable high power ratings of 10's to 100's of MW to be realized.

This approach however requires a complex and active IGBT drive, and requires large passive snubber components to ensure that the high voltage across the series strings of IGBTs 10 shares properly during converter switching. In addition the IGBTs 10 need to switch on and off several times at high voltage over each cycle of the AC supply frequency to control the harmonic currents being fed to the AC network 16. These factors lead to high losses, high levels of electromagnetic interference and a complex design.

Another known voltage source converter is shown in FIG. 1b and includes a multilevel converter arrangement. The multilevel converter arrangement includes converter bridges or cells 18 connected in series, each converter cell 18 including a pair of series connected IGBTs 20 connected in parallel with a capacitor 22. Each converter cell 18 is switched at a different time and such an arrangement eliminates the problems associated with the direct switching of series connected IGBTs because the individual converter cells 18 do not switch simultaneously and converter steps are comparatively small.

The capacitor 22 of each converter cell 18 must however have a high capacitive value to constrain the voltage variation at the capacitor terminals in the multilevel converter arrangement. Six DC side reactors 24 are also required to enable the parallel connection and operation of the converter limbs, and are primarily used to limit transient current flow between converter limbs.

These factors lead to expensive, large and heavy equipment with significant amounts of stored energy, making pre-assembly, testing and transportation of the equipment difficult.

In addition, the use of a large number of individually controlled cells means that a high number of fibre-optic communication channels are often required between ground level control and the high voltage converter. This is complex, expensive and requires sophisticated designs and very fast and accurate processing.

SUMMARY AND DESCRIPTION OF ASPECTS OF THE INVENTION

According to an aspect of the invention there is provided a voltage source converter for HVDC power transmission comprising at least one phase element consisting solely of series connected diodes to interconnect, in use, a DC network and an AC network, and at least one auxiliary converter to act as a waveform synthesizer to modify the DC voltage presented to the DC side of the or each phase element.

The use of at least one phase element consisting solely of series connected diodes allows the voltage source converter to operate as a one-quadrant rectifier in which power may only flow in a single direction. It therefore allows the creation of a voltage source converter that may only be used to transfer power from an AC network connected to an AC side of the converter to a DC network connected to a DC side of the converter.

Such an unsymmetrical export-import transfer of power between the AC and DC networks renders the voltage source converter suitable for use in high voltage applications, such as offshore wind farms, that are heavily biased towards the export of power and only require minimum input of power.

Since the use of at least one phase element consisting solely of series connected diodes ensures that power may only flow from an AC network to a DC network, the other elements that would otherwise be required to facilitate the transfer of power from the DC network to the AC network, namely semiconductor switches, may be omitted. This in turn results in an increase in efficiency since the diodes in the or each phase element do not require any form of control. The gate drives, fibre optic communication links and power supplies that would otherwise be required to control the semiconductor switches may therefore be omitted also.

Consequently, in unsymmetrical applications, use of the high voltage converter of the invention results in reductions in size, weight and cost when compared with a voltage source converter that facilitates a symmetrical transfer of power.

The inclusion of at least one auxiliary converter allows the DC voltage that is presented to the DC side of the voltage source converter to be shaped so as to reduce the effects of low order harmonics. The inclusion of at least one auxiliary converter therefore allows for the generation of an AC waveform on the AC side of the voltage source converter with less harmonic distortion.

Preferably the or each auxiliary converter is controllable to synthesize a predetermine waveform for presentation to the DC side of the or each phase element. In one such embodiment, the or each auxiliary converter may be controllable to synthesize a waveform closely approximating an offset rectified sinusoid waveform for presentation to the DC side of the or each phase element.

The synthesis and presentation of an offset rectified sinusoid waveform to the DC side of the phase element results in a near-perfect sine-wave, with minimal harmonic distortion on the AC side of the phase element. There is therefore no requirement for harmonic filters on the AC side of the voltage source converter to control power quality.

The synthesis and presentation of an offset rectified sinusoid waveform to the DC side of the phase element also allows the diodes to switch at near zero voltage, thereby minimizing switching losses in normal operation of the converter, whilst ensuring that the voltage profile seen by the series diodes, which is imposed and controlled by the auxiliary converter, is a slowly changing waveform rather than the high voltage steps normally applied.

The or each auxiliary converter preferably includes a single-phase multilevel converter to function as a high precision waveform synthesizer.

The single-phase multilevel converter is preferably a chain-link type converter. However, in other embodiments, the single-phase multilevel converter may be a diode clamped converter or a flying capacitor converter.

The use of a multilevel converter allows the synthesis of high precision waveforms and therefore removes the need for complex active gate drives and large voltage sharing components within the main converter design. It therefore results in simpler, less expensive and more efficient hardware.

Preferably the or each chain-link converter includes a chain of modules connected in series, each module including at least one pair of semiconductor switches connected in parallel with an energy storage device, and the semiconductor switches are controllable in use such that the chain of modules connected in series provides a continuously variable voltage source.

The structure of the chain-link converter allows the build-up of a combined voltage, which is higher than the voltage provided by an individual module, via the insertion of multiple modules into the chain-link converter. By continuously varying the value of the combined voltage, the chain-link converter may be operated to generate complex voltage waveforms.

The use of a chain-link type converter also allows the use of a converter that is unidirectional (i.e. produces voltage steps in one polarity only) or bidirectional (i.e. produces voltage steps in both positive and negative polarities).

In order to provide a unidirectional single-phase multilevel converter, the chain-link type converter may include a chain of modules connected in series, each module including a pair of semiconductor switches and an energy storage device connected in parallel in a half-bridge arrangement to define a 2-quadrant unipolar module that can develop zero or positive voltage.

In order to provide a bidirectional single-phase multilevel converter, the chain-link type converter may include a chain of modules connected in series, each module including two pairs of semiconductor switches and an energy storage device connected in parallel in a full-bridge arrangement to define a 4-quadrant bipolar module that can develop positive or negative voltage.

In embodiments employing the use of one or more bidirectional single-phase multilevel converters, the chain-link converter preferably includes an energy source to bias the converter. The energy source may, for example, be provided in the form of a battery, a fuel cell or a charged capacitor.

Similarly the energy storage device of each module may be provided in the form of a battery, fuel cell or a capacitor.

The energy source and energy storage device may effectively include any device that is capable of storing and releasing electrical energy to provide a voltage. This flexibility is useful in designing converter stations in different locations where the availability of equipment may vary due to locality or transport difficulties.

Preferably each semiconductor switch is an insulated gate bipolar transistor, a gate turn-off thyristor or an integrated gate-commutated thyristor.

The use of a semiconductor switch is advantageous because such devices are small in size and weight, and have relatively low power dissipation, which minimizes the need for cooling equipment. It therefore leads to significant reductions in power converter cost, size and weight.

The or each phase element may be connected in series or in parallel with the or each auxiliary converter.

In one such embodiment, a plurality of phase elements are connected in series with at least one auxiliary converter on the DC side of the circuit to define a two terminal DC network for multi-phase electrical power transmission.

In other embodiments, an auxiliary converter may be connected in series with the or each phase element so that the or each phase element and the respective auxiliary converter form a single phase converter limb.

In further embodiments, an auxiliary converter may be connected in parallel with the or each phase element so that the or each phase element and the respective auxiliary converter form a single phase converter limb.

Regardless of whether the auxiliary converter is connected in series or in parallel with the or each phase element in each single phase converter limb, a multi-phase voltage source converter may be constructed by connecting a plurality of converter limbs in series or in parallel on the DC side of the circuit to define a two terminal DC network for multi-phase electrical power transmission.

In embodiments where a plurality of converter limbs are connected in parallel, buffer reactors are preferably interconnected between each limb and the or each neighboring limb so as to minimize the dynamic interaction between each converter limb and the or each neighboring limb.

As outlined above, the use of at least one phase element consisting solely of series connected diodes means that, in use, the voltage source converter may only transfer power from an AC network connected to the AC side of the converter to a DC network connected to the DC side of the converter. However it is envisaged that in embodiments where the or each auxiliary converter includes a chain-link converter, the or each auxiliary converter may be configured to enable, in use, a limited amount of real power to be transferred from a DC network to an AC network.

This is because the multilevel converter can be operated in four quadrants by controlling the phase angle and magnitude of the AC side converter generated waveform and therefore can absorb or generate real power and reactive power.

In one such embodiment, the or each phase element is connected to a primary winding of an AC transformer and the auxiliary converter includes a pair of chain-link converters connected in parallel with the or each phase element in a full-bridge (or H-bridge) arrangement with a secondary winding of the AC transformer.

The connection of the auxiliary converter, in use, to the AC network via the secondary winding of the AC transformer allows real power to be exchanged between the DC network and the AC network.

In another such embodiment, where the or each phase element is connected to a primary winding of an AC transformer, the auxiliary converter may include a chain-link converter connected in parallel with the or each phase element in a half-bridge arrangement with a secondary winding of the AC transformer.

Preferably, in such embodiments, the or each auxiliary converter includes a switching arrangement that is controllable to switch the secondary winding of the AC transformer in and out of circuit, as required. The secondary winding may then be disconnected from the or each auxiliary converter during normal operation of the voltage source converter and connected to the or each auxiliary converter when power transfer from the DC network to the AC network is required.

Any such switching arrangement may include mechanical and/or semiconductor switches.

BRIEF DESCRIPTION OF THE DRAWINGS

Preferred embodiments of the invention will now be described, by way of non-limiting examples, with reference to the accompanying drawings in which.

While the present invention is described herein in connection with certain embodiments, it is to be understood that the invention is not limited to the disclosed embodiments, but, on the contrary, is intended to cover various modifications and equivalent arrangements included within the spirit and scope of the appended claims, and equivalents thereof.

Figure 2:
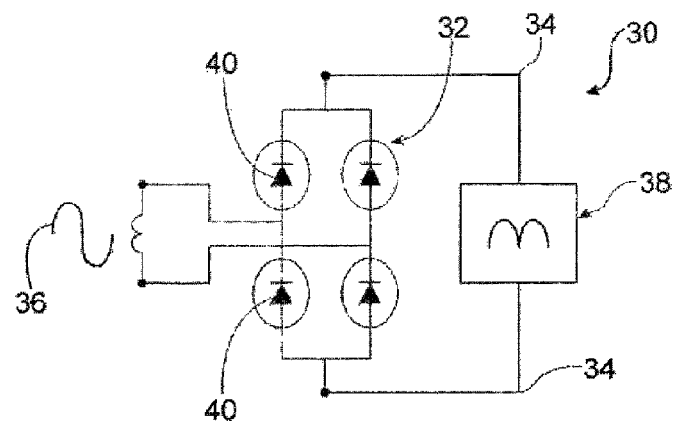
FIGS. 2 and 3 illustrate in schematic form voltage source converters according to embodiments of the invention.

A voltage source converter 30 according to the invention is shown in schematic form in FIG. 2.

The voltage source converter 30 includes a phase element 32 consisting solely of series connected diodes 40 to interconnect, in use, a DC network 34 and an AC network 36. The voltage source converter 30 also includes an auxiliary converter 38 to act as a waveform synthesizer to modify the DC voltage presented to the DC side of the phase element 32.

The phase element 32 includes two pairs of series connected diodes 40 connected in parallel in a full-bridge arrangement to define a bridge rectifier. Each series connected pair of diodes 40 conducts for 180 electrical degrees during AC to DC voltage conversion. The phase element 32 of the voltage source converter 30 therefore acts as a one-quadrant rectifier, which enables power to flow from the AC network 36 to the DC network 38.

The diodes 40 of the phase element 32 do not require any form of control due to their passive nature. Consequently the phase element 32 shown in FIG. 2 provides a particularly efficient structure for use in high voltage applications that are heavily biased towards the export of power from an AC network and only require minimal import of power.

Figure 3:
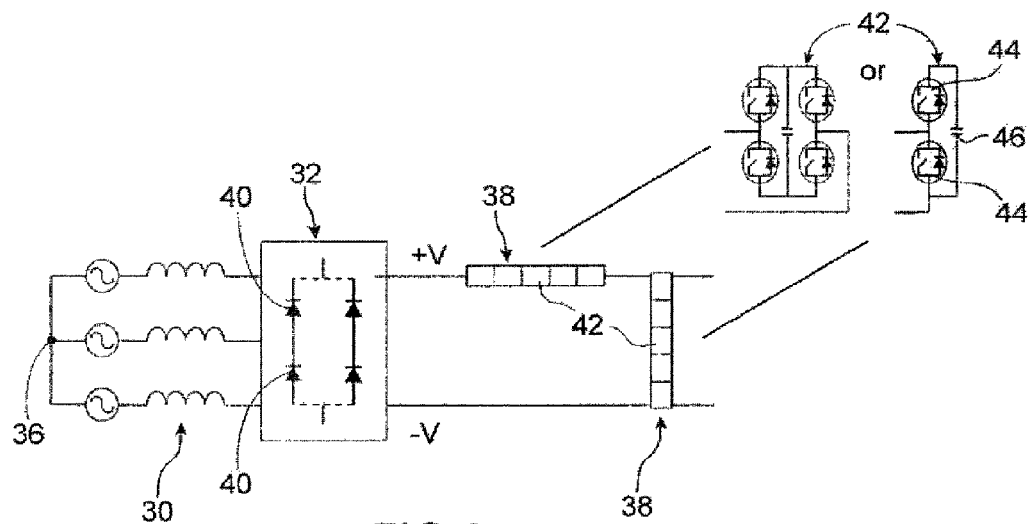

Referring to FIG. 3, it is envisaged that in other embodiments the or each phase element 32 of the voltage source converter 30 may include a string of diodes 40 to facilitate the required AC to DC voltage conversion.

The auxiliary converter 38 includes a single-phase multilevel converter that, in use, modifies the voltage presented to the DC side of the phase element 32 to synthesize a waveform closely approximating an offset rectified sinusoid waveform. This results in the generation of a near-perfect sine wave, with minimal harmonic distortion, on the AC side of the phase element 32.

The voltage source converter 30 does not therefore require harmonic filters on the AC side of the phase element 32 to control power quality. In the absence of the auxiliary converter 38, the phase elements 32 would draw a current from the AC network 36 containing large low order harmonics such as $3^{rd}$, $5^{th}$, $7^{th}$ and $9^{th}$ harmonics, which would result in undesirable harmonic distortion in the AC side waveform unless harmonic filters were incorporated.

The generation of a near-perfect sine wave on the AC side of the phase element 32 allows the diodes 40 to be switched at near zero voltage, otherwise known as soft switching, and therefore minimizes switching losses in normal operation of the voltage source converter 30.

In other embodiments it is envisaged that the auxiliary converter 38 may be controlled to synthesize other waveforms depending on the desired functionality of the voltage source converter 30.

The use of the auxiliary converter 38 means that the voltage profile presented to the diodes 40 of the phase element is imposed and controlled by the auxiliary converter 38, and is a slowly changing waveform rather than the high voltage steps that would otherwise be presented to the diodes 40. It therefore removes the need for complex active gate drives and large voltage sharing components within the main converter design and instead results in simpler, less expensive and more efficient hardware.

The use of the auxiliary converter 38 also enables the voltage imposed on the diodes 40 to be rapidly ramped to zero (or minimum value) when required during fault conditions to facilitate soft switching at reduced voltage.

Figure 4:
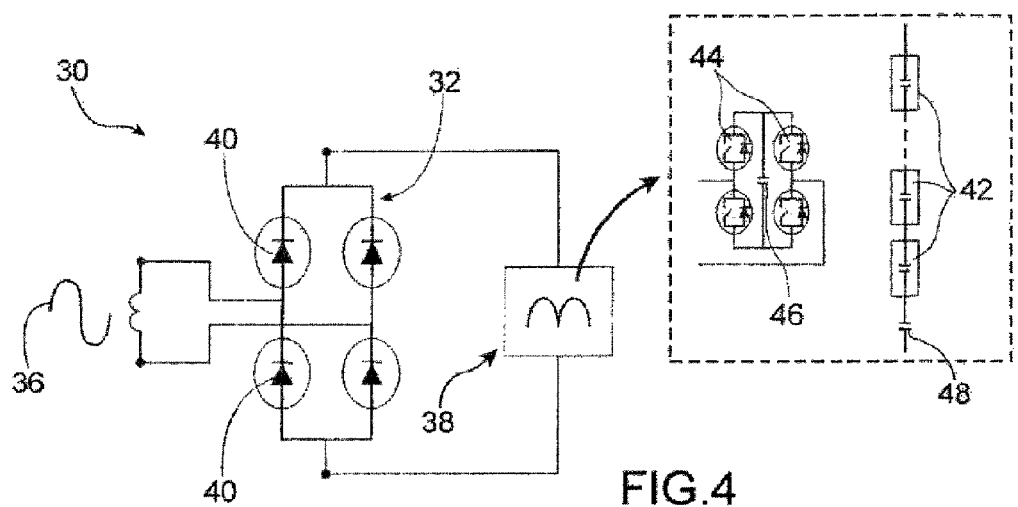
FIGS. 4 to 8 show specific embodiments of the voltage source converters illustrated in FIGS. 2 and 3.
Figure 5:
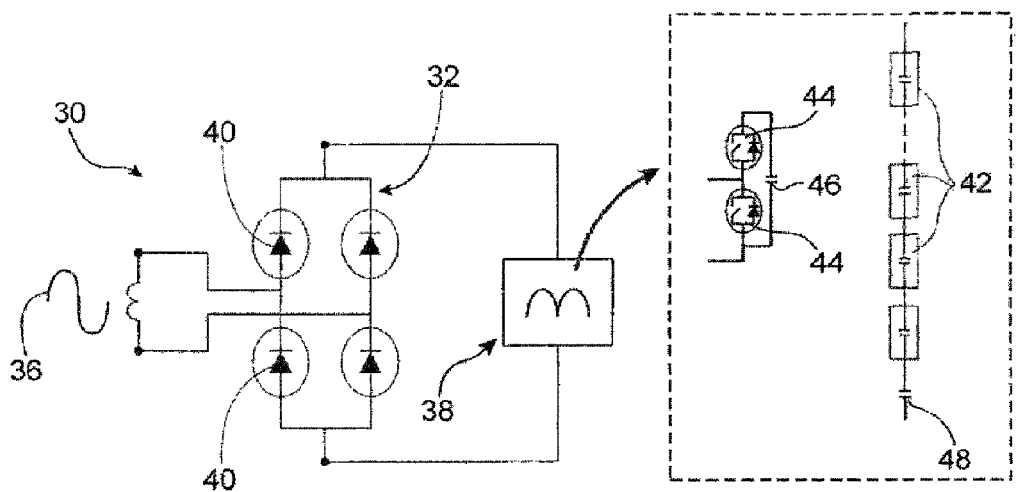

In the embodiments shown in FIGS. 3, 4 and 5, the auxiliary converter 38 is provided in the form of a chain-link converter including a chain of modules 42 connected in series. Each of the modules 42 includes at least one pair of semiconductor switches 44 connected in parallel with an energy storage device, the semiconductor switches 44 being controllable in use so that the chain of modules 42 provides a continuously variable voltage source and is therefore operable to synthesize the required waveform.

Referring to FIG. 4 the energy storage device of each of the modules 42 of the chain-link converter is provided in the form of a capacitor 46, which is connected with two pairs of semiconductor switches 44 in a full-bridge arrangement to form a 4-quadrant bipolar module that can develop positive, zero or negative voltage and can conduct current in both directions.

Each of the semiconductor switches 44 of the modules 42 includes an insulated gate bipolar transistor accompanied by a reverse-parallel connected diode.

Referring to FIG. 5 the energy storage device of each of the modules 42 of the chain-link converter is again provided in the form of a capacitor 46, which is connected with a pair of semiconductor switches 44 in a half-bridge arrangement to define a 2-quadrant unipolar module that can develop zero or positive voltage and can conduct current in both directions.

In other embodiments, it is envisaged that the capacitor 46 of each of bipolar modules 42 shown in FIG. 4 or the unipolar modules 42 shown in FIG. 5 may be replaced by a battery, fuel cell or any other device capable for storing and releasing energy, It is also envisaged that each of the insulated gate bipolar transistors may be replaced by a different semiconductor switch, such as a gate turn-off thyristor, a field-effect transistor or an integrated gate-commutated thyristor, accompanied by a reverse-parallel connected diode.

In each of the voltage source converters 30 shown in FIGS. 4 and 5, each module 42 may be bypassed or inserted into the respective chain-link converter by changing the states of the semiconductor switches 44.

A module 42 is bypassed when the semiconductor switches 44 of the module 42 are configured to form a short circuit in the module 42, causing the current in the voltage source converter 30 to pass through the short circuit and bypass the respective capacitor 46.

A module 42 is inserted into the respective chain-link converter when the semiconductor switches 44 of the module 42 are configured to allow the converter current to flow into and out of the respective capacitor 46, which is then able to discharge its stored energy and provide a voltage.

It is therefore possible to build up a combined voltage across each of the chain-link converters, which is higher than the voltage of each of the respective, individual modules 42, via the insertion of multiple modules 42 into the chain-link converter. By controlling the switching of the semiconductor switches 44 it is also possible to control each of the chain-link converters so as to construct complex waveforms and thereby allow the respective auxiliary converter to synthesize a waveform closely approximating an offset rectified sinusoid waveform for presentation to the DC side of the phase element 32.

It is envisaged that in embodiments employing the use of bipolar modules 42, an energy source may be used to bias the auxiliary converter 38 to synthesize the required offset waveform. Referring to FIG. 4, the energy source is provided in the form of a charged capacitor 48. In other embodiments, the energy source may be provided in the form of a battery or fuel cell.

In other embodiments it is envisaged that the or each auxiliary converter may include other single-phase multilevel converters such as a flying capacitor converter or a neutral point diode converter, which are capable of synthesizing high precision waveforms.

In the embodiment shown in FIG. 2, the auxiliary converter 38 is connected in parallel with the phase element 32 to define a single phase converter 30 suitable for connection between a DC network 38 and a single phase AC network 36.

In other embodiments, as illustrated in FIG. 3, it is envisaged that a plurality of phase elements 32 may be interconnected to provide a voltage source converter 30 that is suitable for connection between a DC network 34 and a multi-phase AC network 36. Referring to FIG. 3, one or more auxiliary converters 38 may be connected in such embodiments in series with the phase elements 32 or connected in parallel with the phase elements 32.

Figure 6:
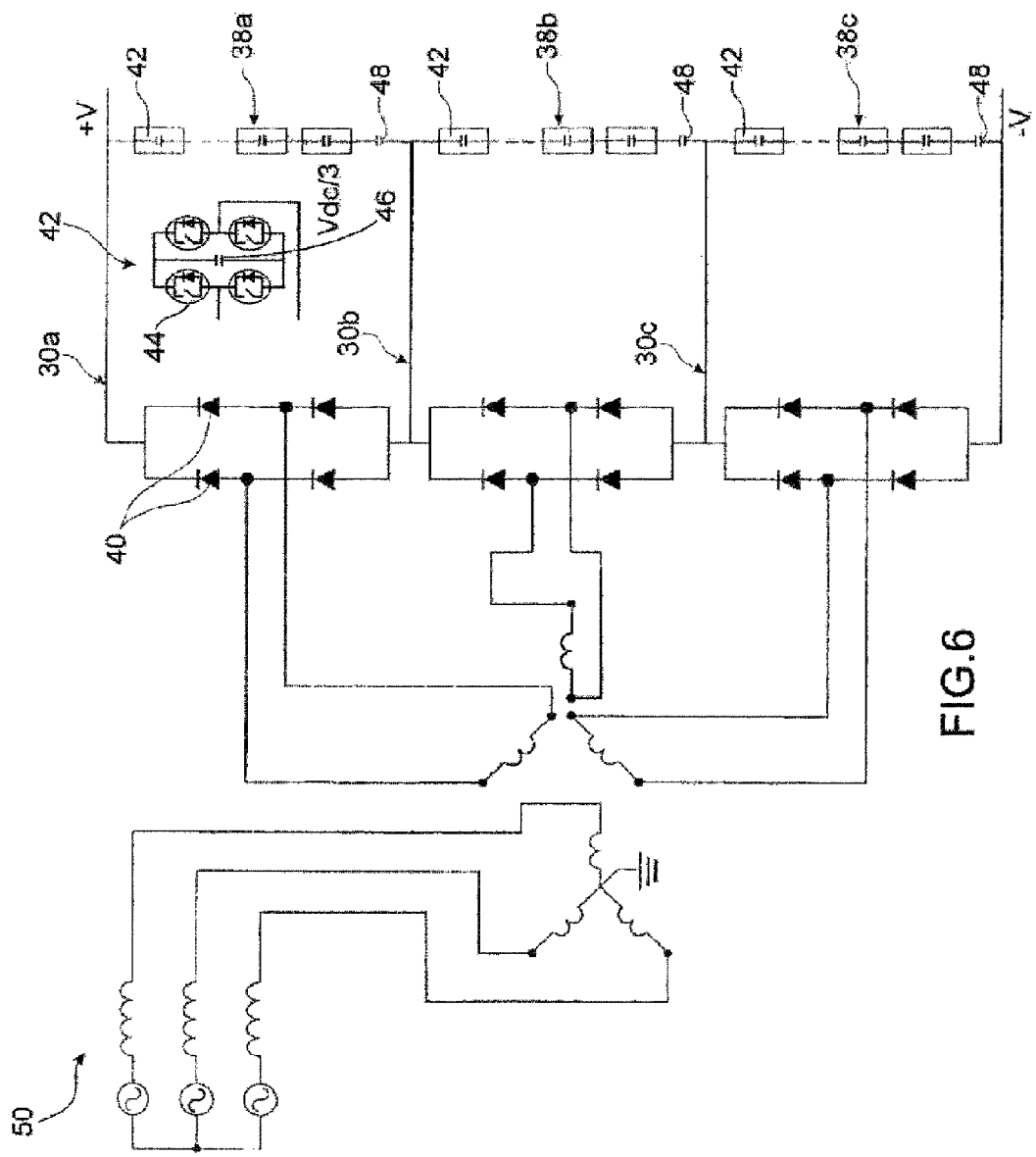

A three phase multilevel voltage source converter 50 according to an embodiment of the invention is shown in FIG. 6.

The three phase multilevel converter 50 includes three single phase converters 30a,30b,30c connected in series to form a two terminal DC network for electrical transmission.

The structure and function of each of the single phase converters 30a,30b,30c of the three phase converter 50 is the same as that of the single phase converter 30 shown in FIG. 4, the auxiliary converter 38a,38b,38c of each of the single phase converters 30a,30b,30c including full-bridge, bipolar modules 42.

Figure 7:
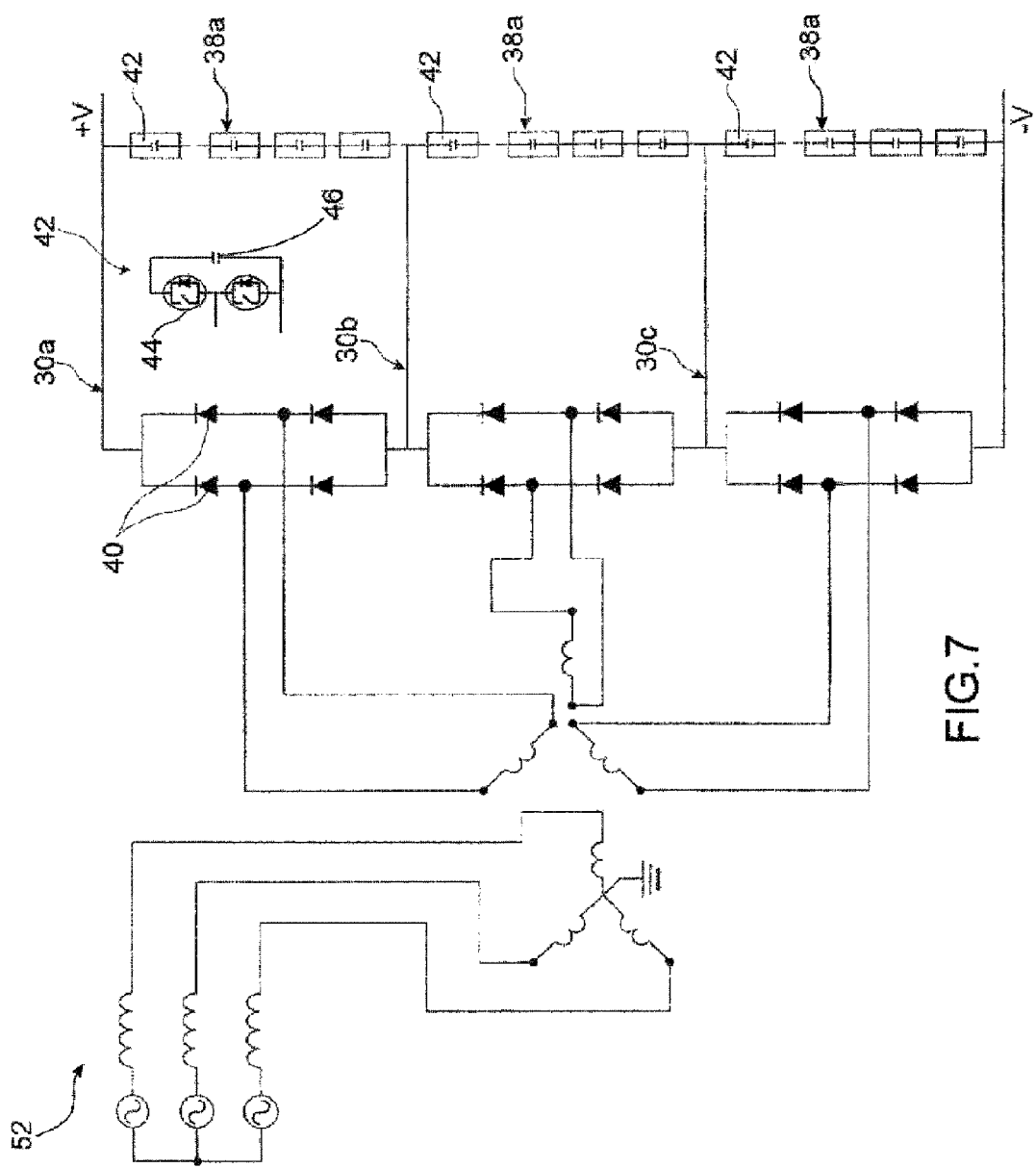

Another three phase multilevel converter 52 according to an embodiment of the invention, including three single phase converters 30a,30b,30c connected in series, is shown in FIG. 7.

The structure and function of each of the single phase converters 30a,30b,30c is the same as that of the single phase converter 30 shown in FIG. 5, the auxiliary converter 38a, 38b,38c of each of the single phase converters 30a,30b,30c including half-bridge, unipolar modules 42.

In each of the embodiments shown in FIGS. 6 and 7, the auxiliary converters 38a,38b,38c operate independently and 120 electrical degrees part from each other.

In use, the DC output voltage in each of the embodiments shown in FIGS. 6 and 7 is the sum of the individual synthesized waveforms operating 120 electrical degrees apart. In normal operation these sum to a $6^{th}$ harmonic ripple voltage at the output of each of the voltage source converters 50,52.

Each of the converters 50,52 can be considered to produce one "pole" of a DC transmission scheme. Bi-pole schemes may be constructed by connecting two such poles in series on the DC side of the installation.

An additional phase shift of 30 electrical degrees may be introduced by the transformer connection by either configuring a 3-phase star winding into delta (which may be practical on the primary side) or introducing a more complex interconnected star (or zig-zag) secondary. This has the advantage that the DC output ripple is reduced in magnitude and becomes a $12^{th}$ harmonic waveform.

Figure 1A:
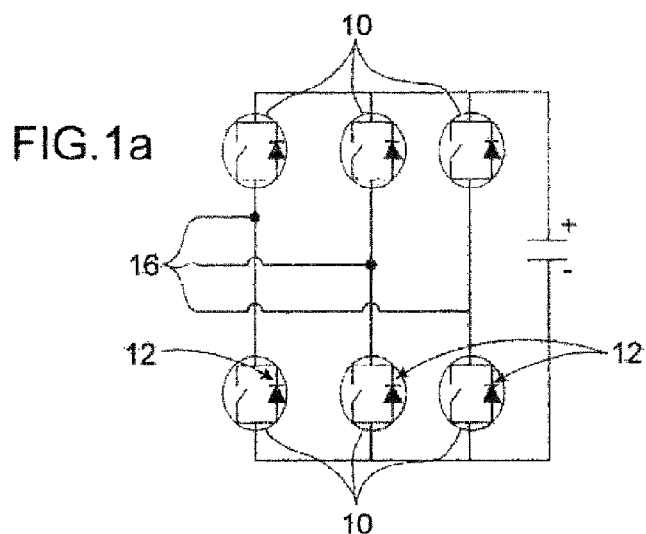
FIGS. 1a and 1b show, in schematic form, prior art voltage source converters for HVDC power transmission.
Figure 1B:
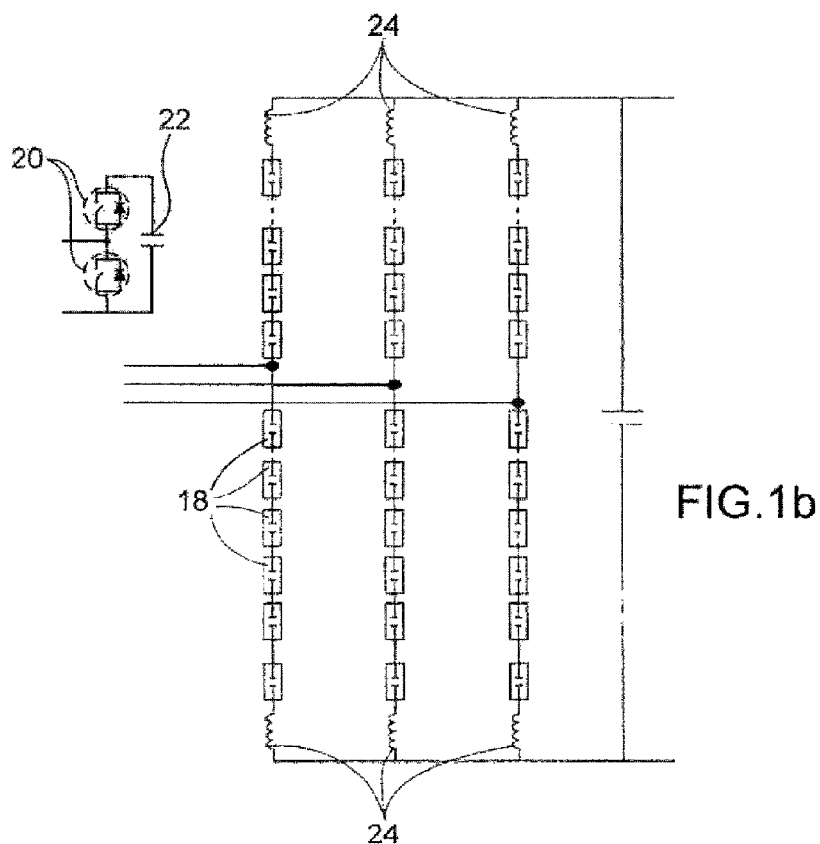

The DC capacitors 46,48 (all capacitors within the chain modules) of the auxiliary converters 38a,38b,38c of the converters 50,52 shown in FIGS. 6 and 7 conduct $2^{nd}$ harmonic current components rather than the fundamental current components experienced by the multilevel converter prior art arrangement shown in FIG. 1b. Therefore, for the same current rating, the capacitance required to control ripple voltage excursion is about half the value.

In addition, significantly fewer modules 42 are required in each of the auxiliary converters 38a,38b,38c of the converters 50,52 shown in FIGS. 6 and 7 than are required in the prior art arrangement shown in FIG. 1b.

Figure 8:
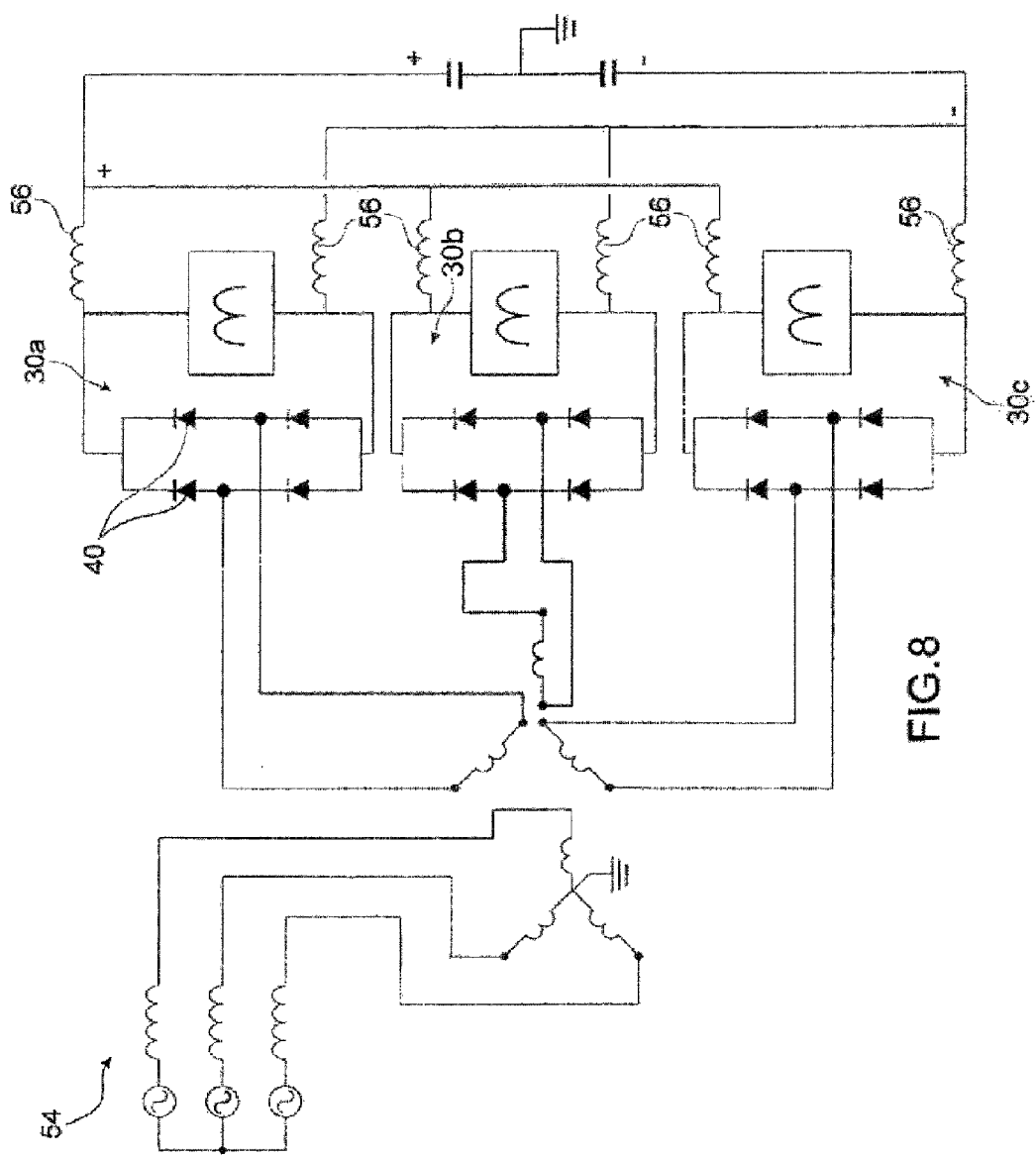

FIG. 8 shows a voltage source converter 54 according to a further embodiment of the invention in which three single phase converters 30a,30b,30c are connected in parallel to form a three phase converter.

The single phase converters 30a,30b,30c may be provided in the form shown in either of FIGS. 4 and 5.

To minimize dynamic interactions, buffer reactors 56 are connected between each of the single phase converters 30a, 30b,30c and its neighbours.

Figure 9:
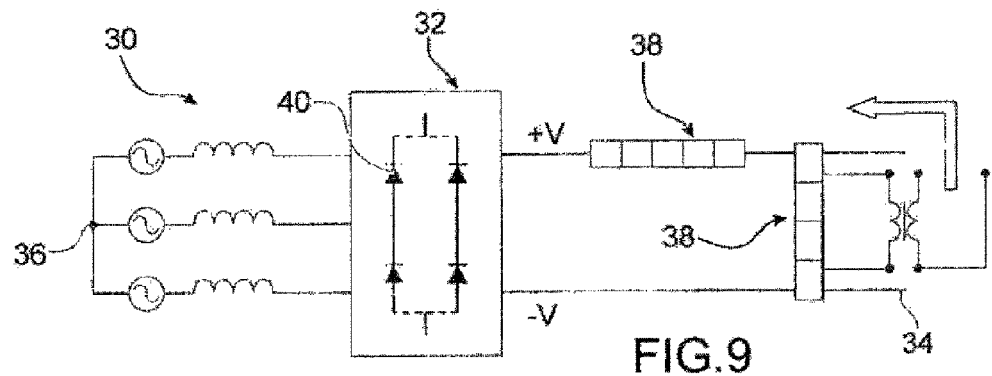
FIG. 9 illustrate in schematic form voltage source converters according to embodiments of the invention.

Referring to FIG. 9 it is envisaged that in embodiments where the or each auxiliary converter 38 includes a chain-link converter connected in parallel with the or each phase element 32, the or each auxiliary converter 38 may be configured to enable, in use, a limited amount of real power to be transferred from the DC network 34 to the AC network 36.

This is because multilevel converters can be operated in four quadrants by controlling the phase angle and magnitude of the AC side converter generated waveform and therefore can absorb or generate real power.

Figure 10:
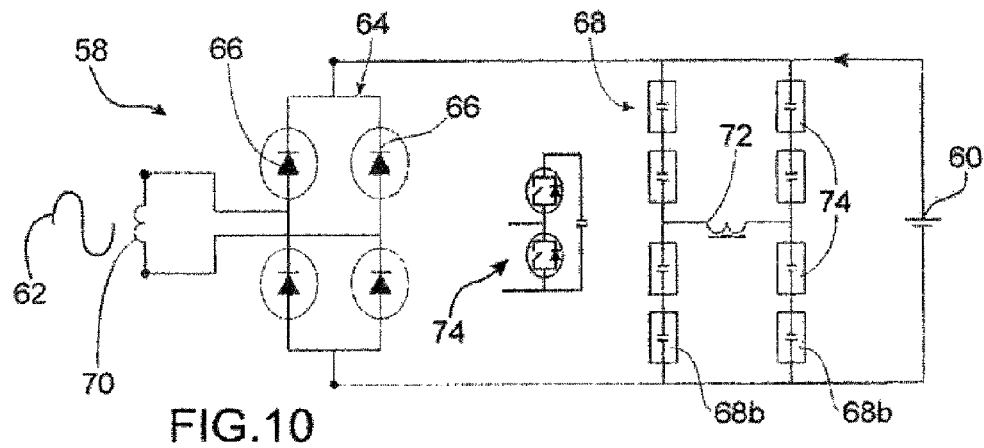
FIGS. 10 and 11 show specific embodiments of the voltage source converters illustrated in FIG. 9.

A single-phase voltage source converter 58 having a capability to transfer real power from a DC network 60 to an AC network 62, according to an embodiment of the invention, is shown in FIG. 10.

The voltage source converter 58 includes a phase element 64 consisting solely of two series connected pairs of diodes 66 connected in parallel in a full-bridge arrangement, and an auxiliary converter 68 connected in parallel with the phase element 64 and with the DC network 60.

The phase element 64 is connected to a primary winding 70 of an AC transformer and the auxiliary converter 68 is connected to a secondary winding 72 of the AC transformer, the auxiliary converter 68 including two chain-link converters 68a,68b connected in a full-bridge (or H-bridge) arrangement with the secondary winding 72 of the AC transformer.

The secondary winding 72 of the AC transformer is connected between midpoints of the chain-link converters 68a, 68b so that the number of modules 74 on each side of the connection points is equal.

While each of the chain-link converters 68a,68b of the voltage source converter 58 shown in FIG. 10 includes half-bridge, unipolar modules 74, it is envisaged that in other embodiments the half-bridge, unipolar modules 74 may be replaced with full-bridge, bipolar modules.

Figure 11:
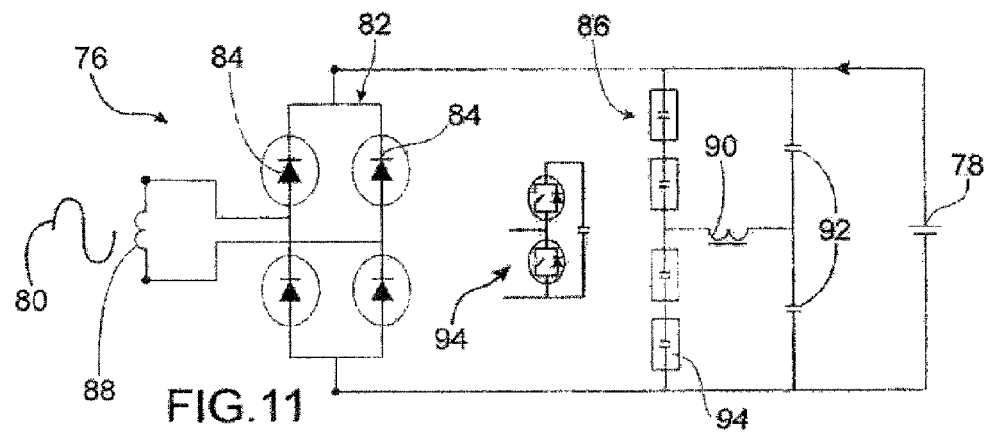

A single-phase voltage source converter 76 having a capability to transfer real power from a DC network 78 to an AC network 80, according to another embodiment of the invention, is shown in FIG. 11.

The voltage source converter 76 includes a phase element 82 consisting solely of two series connected pairs of diodes 84 connected in parallel in a full-bridge arrangement, and an auxiliary converter 86 connected in parallel with the phase element 82 and with the DC network 78.

The phase element 82 is connected to a primary winding 88 of an AC transformer and the auxiliary converter 86 is connected to a secondary winding 90 of the AC transformer, the auxiliary converter 86 including a chain-link converter connected in a half-bridge arrangement with the secondary winding 90 of the AC transformer.

In the embodiment shown in FIG. 11, the voltage source converter 76 further includes a pair of link capacitors 92 connected in parallel with the phase element 82 and the DC network 78. The secondary winding 90 of the AC transformer is connected between a midpoint of the chain-link converter of the auxiliary converter 86, so that the number of modules 94 on each side of the connection point is equal, and a midpoint between the two link capacitors 92.

While the chain-link converter of the auxiliary converter 86 of the voltage source converter shown in FIG. 11 includes half-bridge, unipolar modules 94, it is envisaged that in other embodiments the half-bridge, unipolar modules 94 may be replaced with full-bridge, bipolar modules.

Preferably, in each of the embodiments shown in FIGS. 10 and 11, the auxiliary converters 68,86 include a switching assembly, which may include mechanical and/or semiconductor switches, to facilitate switching the secondary winding 72,90 of the AC transformer to be switched in and out of circuit as necessary. The secondary winding 72,90 of the AC transformer may then be disconnected from the voltage source converter 58,76 during normal operation and connected to the auxiliary converter 68,86 when it is necessary to transfer power from the DC network 60,78 to the AC network 62,80.

It is envisaged that a plurality of the single-phase voltage source converters 58,72 may be interconnected in a similar manner to the arrangements shown in FIGS. 6 to 8 to create multi-phase voltage source converters including a capability to transfer power from a DC network to an AC network.

What is claimed is:

1. A voltage source converter for HVDC power transmission comprising:
   at least one bridge rectifier having series connected diodes configured to interconnect, in use, a DC network on a DC side of the at least one bridge rectifier and an AC network on a AC side of at least one bridge rectifier; and
   at least one auxiliary converter comprising a single-phase multilevel converter connected to the DC side of the at least one bridge rectifier, the at least one auxiliary converter configured to modify a DC voltage present on the DC side of the at least one bridge rectifier,
   wherein the at least one auxiliary converter is controllable to synthesize a predetermined waveform to the DC side of the at least one bridge rectifier resulting in a sine wave, with minimal harmonic distortion, being generated on the AC side of the at least one bridge rectifier,
   wherein the predetermined waveform is a waveform closely approximating an offset rectified sinusoid waveform on the DC side of the at least one bridge rectifier.

2. The voltage source converter according to claim 1, wherein the at least one of the single-phase multilevel converter is configured as a chain-link converter.

3. The voltage source converter according to claim 2, wherein the chain-link converter includes a chain of modules connected in series, each module including at least one pair of semiconductor switches connected in parallel with an energy storage device, and the semiconductor switches are configured to be controlled such that the chain of modules connected in series provides a continuously variable voltage source.

4. The voltage source converter according to claim 3, wherein the chain-link converter includes a chain of modules connected in series, each module including a pair of semiconductor switches connected in parallel with an energy storage device in a half-bridge arrangement to define a 2-quadrant unipolar module that can develop zero or positive voltage.

5. The voltage source converter according to claim 3, wherein the energy storage device comprises one of a battery, a fuel cell, and a capacitor.

6. The voltage source converter according to claim 3, wherein each semiconductor switch comprises one of an insulated gate bipolar transistor, a gate turn-off thyristor, and an integrated gate-commutated thyristor.

7. The voltage source converter according to claim 3, wherein the chain-link converter includes a chain of modules connected in series, each module including two pairs of semiconductor switches connected in parallel with an energy storage device in a full-bridge arrangement to define a 4-quadrant bipolar module that can develop positive or negative voltage.

8. The voltage source converter according to claim 7, wherein the chain-link converter includes an energy source configured to bias the auxiliary converter.

9. The voltage source converter according to claim 8, wherein the energy source comprises one of a battery, a fuel cell, and a charged capacitor.

10. The voltage source converter according to claim 2, wherein the at least one bridge rectifier is connected to a primary winding of an AC transformer and the at least one auxiliary converter includes a pair of chain-link converters connected in parallel with the at least one bridge rectifier in a full-bridge arrangement with a secondary winding of the AC transformer.

11. The voltage source converter according to claim 10, wherein the at least one auxiliary converter includes a switching arrangement that is controllable to switch the secondary winding of the AC transformer in and out of circuit as required.

12. The voltage source converter according to claim 11, wherein the switching arrangement includes one or more mechanical and/or semiconductor switches.

13. The voltage source converter according to claim 2, wherein the at least one bridge rectifier is connected to a primary winding of an AC transformer and the at least one auxiliary converter includes a chain-link converter connected in parallel with the at least one bridge rectifier in a half-bridge arrangement with a secondary winding of the AC transformer.

14. The voltage source converter according to claim 13, wherein the at least one auxiliary converter includes a switching arrangement that is controllable to switch the secondary winding of the AC transformer in and out of circuit as required.

15. The voltage source converter according to claim 1, wherein an auxiliary converter of the at least one auxiliary converter is connected in parallel with a bridge rectifier of the at least one bridge rectifier, the bridge rectifier and the auxiliary converter forming a single phase converter limb.

16. The voltage source converter according to claim 15, wherein a plurality of single phase converter limbs are connected in series to define a two terminal DC network for multi-phase electrical power transmission.

17. The voltage source converter according to claim 15, wherein a plurality of single phase converter limbs are connected in parallel to define a two terminal DC network for multi-phase electrical power transmission.

18. The voltage source converter according to claim 1, wherein a plurality of single phase converter limbs are connected in series to define a two terminal DC network for multi-phase electrical power transmission.

19. The voltage source converter according to claim 1, wherein a plurality of single phase converter limbs are connected in parallel to define a two terminal DC network for multi-phase electrical power transmission.

20. The voltage source converter according to claim 19 further including buffer reactors interconnected between each limb and a neighboring limb.

\* \* \* \* \*